United States Patent [19]

Mizuno et al.

[11] Patent Number: 5,120,280
[45] Date of Patent: Jun. 9, 1992

[54] TOOTHED POWER TRANSMISSION BELT

[75] Inventors: Takahide Mizuno; Nobutaka Osako; Takeshi Murakami; Yasunori Nakai, all of Kobe, Japan

[73] Assignee: Mitsuboshi Belting Ltd., Japan

[21] Appl. No.: 690,083

[22] Filed: Apr. 23, 1991

[30] Foreign Application Priority Data

Apr. 24, 1990 [JP] Japan ................... 2-109773

[51] Int. Cl.$^5$ ............................................. F16G 1/10
[52] U.S. Cl. .................................. 474/260; 474/263
[58] Field of Search ........................... 474/260–268, 474/205; 128/90; 428/76; 264/210.7, 176.1, 290.5

[56] References Cited

U.S. PATENT DOCUMENTS 4,514,179  4/1985  Skura ........................... 474/266 X
4,555,241 11/1985  Takano et al. ..................... 474/261
4,984,566  1/1991  Sekine et al. ..................... 128/90

FOREIGN PATENT DOCUMENTS 62-183147 11/1987 Japan .

Primary Examiner—Thuy M. Bui
Attorney, Agent, or Firm—Wood, Phillips, Van Santen, Hoffman & Ertel

[57] ABSTRACT

A transmission belt having a base section with a plurality of teeth spaced lengthwise of the belt and a canvas layer covering the teeth. The canvas layer has weft yarns extending in a lengthwise direction defined by aromatic polyamide fiber spun yarn twisted with a urethane elastic yarn. The canvas layer further includes warp yarns made by twisting a plurality of filaments, at least one of which is aliphatic mono-filament of 10 to 50 denier, or a plurality of aromatic polyamide multi-filament of 1 to 6 denier.

24 Claims, 1 Drawing Sheet

TOOTHED POWER TRANSMISSION BELT

BACKGROUND OF THE INVENTION

1. Field of the Invention

This invention relates to toothed power transmission belts and, more particularly, to a canvas layer for placement over the belt teeth to enhance resistance of the belt teeth to heat, abrasion, and cracking.

2. Background Art

Transmission belts with longitudinally spaced drive teeth are well known in the prior art. It is known to cover the teeth with a canvas layer to lengthen the belt life. It is known, for example, to use a twill weave canvas layer having the weft yarns thereof made of a woolie finish yarn formed by twisting filaments of nylon-6 or nylon-6,6. It is also known to form the weft yarns by twisting the above nylon-6 or nylon-6,6 filaments with a urethane elastic yarn. It is also known to make the warp yarns from a filament yarn of nylon-6 or nylon-6,6.

Increased demands on power transmission belts, particularly in the automotive industry, have brought to light several of the deficiencies of the conventional canvas layers, as those described above. The trend in the automobile industry has been to use a single belt to drive a large number of accessories, resulting frequently in very high belt loading. This loading, coupled with the fact that the engine compartments within which the belts operate are often at very high temperatures, frequently results in premature failure of the belts. Designers of such belts have striven to prolong the life of toothed belts in such environments.

In response to this demand for longer lasting belts in these high temperature environments, such as in engine compartments, a number of different rubber materials have been used which are durable and long lasting in high temperature environments. Among these preferred rubber compositions are: chlorosulfonated polyethylene rubber (CSM); and hydrogenated acrylonitrile-butadiene rubber (hydrogenated NBR). These rubber compositions have replaced chloroprene rubber (CR), commonly used in the backing layer and/or teeth of conventional transmission belts.

To further improve operating characteristics of toothed power transmission belts, tension members made with glass cords, processed to be embedded in CSM or hydrogenated NBR, have been used which exhibit superior bending and wear resistance at high temperatures to conventional glass cords, which are typically subjected to an adhesion process for embedding in chloroprene rubber.

Another area of focus for belt designers has been the canvas covering layer for the belt teeth, which is a critical component of such belts. The covering layer is not only exposed to the high temperatures in the engine compartment but also itself generates additional heat through friction between the belt and cooperating pulleys as the belt engages with, separates from, and slips lengthwise relative to, cooperating pulleys. To date, in spite of efforts made by belt designers, the cover canvas layers currently employed remain a problem area that commonly leads to premature belt failure. Premature failure is particularly a problem in the high temperature environments, such as in engine compartments.

Commonly, the prior art cover canvas layers are made from fabric made from one of nylon-6 or nylon-6,6. Certain improvements have been made to the treating agents therefor. Nonetheless, teeth with this type of cover layer commonly break off within a short period under high load, high temperature conditions, due primarily to failure of the nylon canvas layer covering the belt base and teeth.

One proposed solution to the tooth severance problem caused by failure of the canvas layer is the use of a cover fabric layer made by twisting a yarn such as one made from an aliphatic polyamide fiber or polyester fiber with a urethane elastic yarn. The difficulty with the above canvas layers is that they adhere very poorly to the belt teeth due primarily to the fact that the canvas layer does not absorb the rubber glue which is used to effect the adhesion. After the belt repeatedly contacts the pulleys, the rubber glue separates, resulting in excessive wear on the belts and/or reduced life.

A still further prior art canvas cover layer is shown in Japanese Utility Model Laid Open No. 62-183147. This belt has a cover canvas with the weft yarns thereof being made up of at least a woolie processed yarn of an aromatic group polyamide fiber and a urethane elastic yarn extending in the lengthwise direction of the belt. The difficulty with the woolie processed yarn of the aromatic polyamide fiber is that the fiber is a polymer having no melting point. Accordingly, the fibers cannot be heated to facilitate their bending and uniform pre-twisting thereof. The result of this is that the yarns may have a non-uniform diameter. Additionally, the above fibers are highly rigid and, when woven, produce an undesirably rough surface, having a texture similar to that of a towel.

In addition to the uneven surface resulting from the use of the above fibers, a toothed belt using the above described cover canvas layer has a random PLD value. PLD is a measure of the distance between the pitch line or center line of the load carrying cords and the bottom of the belt teeth. The result is that the belts produced from an identical mold may have different lengths, which obviously is undesirable. Further, with belts having random PLD values, the teeth interfere with the side walls of cooperating pulley grooves during operation. Still further, there is a stress concentration at the base of the teeth which may result in crack generation at an early stage in the belt life.

SUMMARY OF THE INVENTION

The present invention is specifically directed to overcoming the above enumerated problems is a novel and simple manner. It is the principal objective of the present invention to provide a cover layer for the teeth on a toothed power transmission belt which results in a highly durable belt which is not prone to cracking or tooth severance even in high temperature, high load environments.

To achieve the above objectives, the present invention contemplates a transmission belt having a base section with a plurality of teeth spaced lengthwise of the belt and a canvas layer covering the teeth. The canvas layer has weft yarns extending in a lengthwise direction defined by aromatic polyamide fiber spun yarn twisted with a urethane elastic yarn. The canvas layer further includes warp yarns made by gathering at least one aliphatic fiber mono-filament of 10 to 50 denier.

The aliphatic mono-filament is preferably a polyamide, and preferably one of polyester, nylon-6, nylon-6,6, nylon 4-6, and nylon-12.

Preferably, the aromatic fiber spun yarn has a polyamide fiber containing an aromatic ring in the main chain of the molecular structure thereof.

The aromatic polyamide fiber spun yarns are made up of at least 40%, and preferably 50%, by weight of an aromatic polyamide fiber.

The warp yarns are made up of 3 to 25 units of aliphatic mono-filament of 10 to 50 denier. Preferably the warp yarns have filaments that are at least one of polyester, aliphatic polyamide.

The warp yarns are preferably twisted 5 to 30 turns per 10 cm. The weft yarns are twisted preferably 8 to 40 turns per 10 cm.

The belt teeth are made preferably from at least one of chlorosulfonated polyethylene rubber (CSM), alkylated chlorosulfonated polyethylene rubber (ACSM), and hydrogenated acrylonitrile-butadiene rubber (hydrogenated NBR).

The warp and weft yarns have a coating thereon consisting of at least one of an RFL solution, isocyanate solution, and epoxy solution.

The invention also contemplates that the warp yarns can be made up of a plurality of gathered aromatic polyamide multi-filament of 1 to 5 denier, which are preferably twisted about themselves.

The invention further contemplates a canvas layer, as described above, for placement over belt teeth.

DETAILED DESCRIPTION OF THE DRAWINGS

Figure 1:
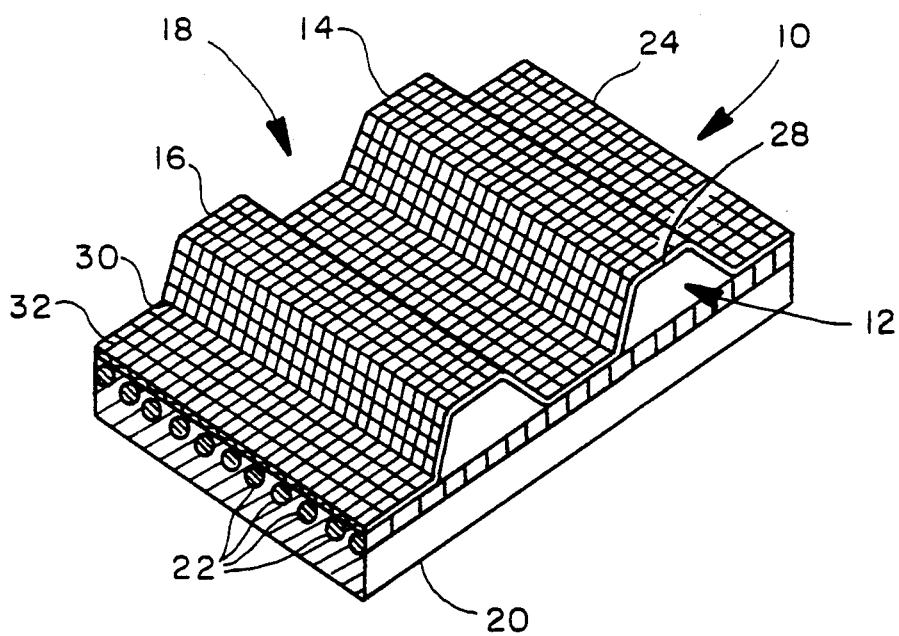
FIG. 1 is a fragmentary, perspective view of a toothed belt according to the present invention.

In FIG. 1, a toothed power transmission belt, according to the present invention, is shown at 10. The belt 10 is made up of a base portion 12 with longitudinally spaced, laterally directed teeth 14, 16 therein, which teeth 14, 16 each engage with complementary pulley recesses (pulley not shown). Grooves 18 are defined between adjacent teeth 14, 16, for reception of complementary pulley teeth. A backing rubber layer 20 has embedded therein a plurality of longitudinally extending, rope-shaped tension cords 22, made from, for example, glass fiber, aromatic polyamide fiber, or carbon fiber, with each cord 22 centered on the belt pitch line. A canvas cover layer 24 is adhered on the exposed surface 28 of the teeth 14, 16 and grooves 18.

The belt base portion 12 is made of a rubber material which exhibits good wear characteristics at high temperatures. Exemplary rubber materials are: chlorosulfonated polyethylene rubber (CSM); alkylated chlorosulfonated polyethylene rubber (ACSM); and hydrogenated acrylonitrile-butadiene rubber (hydrogenated NBR). The last rubber composition is made by adding hydrogen to the double-bonded portion of acrylonitrile-butadiene rubber. These rubber compositions are preferred over conventional diene rubber, such as natural rubber, styrene-butadiene rubber, acrylonitrile-butadiene rubber and chloroprene rubber.

The alkylated chlorosulfonated polyethylene rubber (ACSM) is made by chlorosulfonating a linear low density polyethylene so that the chlorine content falls within a range of between 15 and 45% by weight and the sulfur content falls within a range of between 0.5 and 2.5% by weight. ACSM includes an alkyl side chain that reduces polyethylene crystallization in the main chain so that properties of rubber are realized. ACSM crystallizes very little at low temperatures (not higher than $-10°$ C.) so as to maintain a rubber-like elasticity, making it highly functional at low temperatures.

The canvas cover layer 24 for the inventive belt 10 may be made of a plain weave fabric being extensible in the lengthwise direction of the belt, twilled weave fabric, a satin elastic webbing fabric, or the like.

The canvas cover layer 24 has woven warp and weft yarns 30, 32 respectively. The warp and weft yarns 30, 32 are woven to vertically overlap in alternating fashion along their lengths. With a plain weave fabric, the intersection of the woven warp and weft yarns 30, 32 produces a wavy pattern in the cover layer 24.

When a twilled fabric or a satin elastic webbing fabric is used, the warp and weft yarns 30, 32 form wavy intersections only every several yarns, which results in fewer wavy crossing points than with a plain weave fabric. Further, the rubber permeates more deeply into the spaces between the yarns 30, 32 with a twilled fabric and a satin elastic webbing fabric than with a plain weave fabric.

The rubber also migrates between the warp and weft yarns where they cross to avoid direct contact therebetween. The rubber acts as a cushion layer between the warp and weft yarns. Potentially damaging abrasive contact between the warp and weft yarns 30, 32, which might precipitate their early failure, is thus reduced, even under severe bending.

To increase the extensibility of the canvas cover layer 24, a low-orientation polyester synthetic fiber yarn may be incorporated into the plain weave fabric, twilled weave fabric or satin elastic webbing fabric to form a knit cloth.

To manufacture this canvas cover layer 24, the warp and weft yarns 30, 32 are first covered with an adhesive layer consisting of one of a hardened RFL solution, isocyanate solution, and epoxy solution.

The RFL solution used is a mixture of condensed resorcinol and formalin with latex, where the mole ratio between the resorcinol and formalin is preferably 1:0.5 to 3 to provide adequate adhesive strength.

The condensed resorcinol and formalin is mixed with latex so that the resin content is within the range of 2 to 30 parts by weight per 100 parts by weight of the rubber content of the latex and so that the mixture has a total solid density of 5 to 40%.

The above latex may be at least one of styrene-butadiene-vinylpiridine ternary copolymer, chlorosulfonated polyethylene, hydrogenated NBR, epicholorohydrin, natural rubber, SBR, chloroprene rubber, olefin-vinyl ester copolymer, etc.

The weft yarns 32 in the canvas layer 24 are made by twisting a spun yarn having at least 40% by weight, and preferably 50% by weight, aromatic polyamide fiber, with a urethane elastic yarn. The aromatic polyamide fiber spun yarn has a polyamide fiber containing an aromatic ring in the main chain of the molecular structure thereof. Exemplary commercially available products with this type of fiber are Cornex, Normex, Kevler, and Technora.

The invention also contemplates the use of a yarn made by the aromatic polyamide fiber with another fiber. Still further, an aromatic polyamide fiber spun fiber may be twisted with another fiber and urethane elastic yarn.

It has been found that the content of the aromatic polyamide fiber in the weft yarn 32 should be at least 40%, and preferably 50%, by weight in order to realize the improved resistance to heat and abrasion. The aromatic polyamide fibers preferably have a length of 25-30 mm. The urethane elastic yarn is used to assure that the cover canvas 24 is stretchable.

To effect belt manufacture, the teeth 15 are formed in a mold. The teeth are forced into the mold before vulcanization. It is thus important to have a cover canvas layer 24 that is stretchable to permit this molding process to be carried out without the cover layer 24 weakening or failing. Preferably, the cover layer 24 is stretchable up to at least 70%. The urethane elastic yarn is readily stretchable and is highly desirable for that reason. Urethane elastic yarn is stretched as it is woven into the canvas layer and contracts after the weaving process is completed.

The warp yarns 30 are made preferably of a filament of one of an aliphatic fiber, for example a polyester, polyamide such as nylon-6, nylon-6,6, nylon-4,6, and nylon-12 or polyvinyl alcohol, polyethylene, polypropylene, etc. The filament yarn is made by gathering 3 to 25 units of mono-filament of 10 to 50 denier and twisting the filaments from 5 to 30 turns per 10 cm the in S or Z direction to form the warp yarns 30. The filament may be made by gathering 100 to 200 units of an aromatic polyamide filament of 1 to 6 denier, or twisting the filament units to form a multi-filament warp 30.

Because the weft 32 is made from an aromatic polyamide fiber spun yarn that is highly rigid, the above kind of warp 30 is used to insure uniformity in the pattern of the warp and weft yarns 30, 32. In order to produce a toothed belt by the earlier described press fitting molding method, the material of the canvas layer must be stretchable in the lateral direction to allow the aforementioned lateral stretching and contraction during belt manufacture. When the warp yarn 30 is not rigid, the canvas layer does not contract uniformly during manufacture with the result being that the canvas layer 24 has a rough surface. If the canvas layer 24 does not have a uniform thickness, which results from uneven contraction, the belt life is reduced due primarily to the non-uniform PLD value for the belt, as earlier discussed.

The warp includes a mono-filament of 10 to 50 denier in diameter. When a mono-filament of smaller than 10 denier is used, the highly elastic filaments result in the canvas being contracted unevenly. Use of a mono-filament of greater than 50 denier results in a canvas having an excessive thickness. It is difficult to create a belt with a uniform PLD value using a thick canvas layer 24. The result of this may be that the canvas layer 24 is unusable.

Preferably, the amount of mono-filaments that are gathered is in the range of 3 to 25. When two mono-filaments are twisted together, the resulting canvas layer 24 has a non-uniform thickness. The use of a single filament results in the warp having insufficient resistant to bending.

The weft yarns are preferably twisted 5 to 40 turns per 10 cm and more preferably in the range of 10 to 30 turns per 10 cm. Twisting of less than 5 turns per 10 cm results in the aromatic polyamide spun yarns not fitting into the urethane elastic yarn, thereby resulting in a non-uniform diameter for the weft yarns 32 and resulting a non-uniform canvas layer thickness. With the twisting amount greater than 40 turns per 10 cm, the strength of the canvas in the weft is reduced detrimentally. The result of this is that the cover canvas layer cannot sufficiently reinforce the base portion 12 of the belt teeth. Cracks may be generated in the base portion 12 of the belt early in the life of the belt, which may result in severance of the belt teeth 14, 16.

Below are several examples of belts/canvas layers made according to the present invention. It should be understood that these examples are made only for purposes of explaining the invention. These particular structures should not be viewed as limiting.

EXAMPLE 1

Seven units of 30 denier mono-filament nylon-6,6 were gathered together to form a 210 denier mono-multi yarn that was twisted 15 turns per cm in the S direction to produce the warp. Several spun yarns were formed with materials and dimensions shown in Table 1 with each urethane elastic yarn being extended by 2-4 times during the twisting process. These yarns were twisted together in the S direction at a ratio of 15 turns per 10 cm to produce the weft yarns. The warp and weft yarns 30, 32 were twilled in 2×2 fashion to form each layer and each layer was contracted by 40-55% in its widthwise direction by means of a wince or circular machine.

TABLE 1

|  | 1 | 2 | 3 | 4 | 5 |
|---|---|---|---|---|---|
| Spun Yarn Material (% by weight) | Technora 100 | Cornex 100 | Cornex 80 Nylon-6,6 20 | Cornex 60 Nylon-6,6 40 | Cornex 40 Nylon-6,6 60 |
| Spun yarn diameter | No. 20 | No. 30 | No. 30 | No. 30 | No. 30 |
| Weft Structure | $(T20^S/2 + SD140^D/1)/1$ | $(CX30^S/3 + SD140^D/1)/1$ | $(CX.A30^S/3 + SD140^D/1)/1$ | | |
| Weft Count | 90/5 cm | 100/5 cm | 100/5 cm | 100/5 cm | 100/5 cm |
| Warp Count | 80/5 cm | 80/5 cm | 80/5 cm | 80/5 cm | 80/5 cm |
| Belt No. | A-1 | A-2 | A-3 | A-4 | A-5 |

T: Technora (produced by TEIJIN)
CX: Cornex (produced by TEIJIN)
SD: Urethane elastic yarn
A: Nylon-6,6

Each canvas layer was treated with RFL solution (resorcinol-formalin-latex adhesive treating solution) which has been conventionally used as an adhesive treating solution, and then impregnated with a rubber glue made by dissolving in a solution a rubber composition the same as that used in the belt body. After drying, each canvas layer was placed on a toothed belt.

The construction of a conventional cover canvas (twilled weave) is shown in Table 2 below.

TABLE 2

|  | Conventional Example |
|---|---|
| Weft Material | Nylon-6,6 |
| Weft Diameter | 140D/2 |

TABLE 2-continued

|  | Conventional Example |
|---|---|
| Weft Construction | $(^A140^D/2 - {}^{SD}140^D/1)/1$ |
| Weft Count | 120/5 cm |
| Warp Material | Nylon-6,6 |
| Warp Diameter | 210D |
| Warp Count | 100/5 cm |
| Belt No. | A-6 |

The tensile cord used was a glass cord having a core diameter of 1.2 mm and ECG 150-3/13 construction with the cord initially being subjected to an adhesion process. In this cord construction: B is nonalkaline glass; C is a continuous filament; G is a single filament (9 micron); "150" = 150,000 yd/lb; and "3" = the number of ECG 150 (single strands). The three strands are twisted to form a rope. "13" is the number of the ropes gathered together. The thirteen ropes are twisted to form the ECG 150-3/13. Multiplying three (the number of single strands) by thirteen (the number of plied strands) indicates that there are thirty-nine strands in the cord.

A rubber composition made of hydrogenated NBR, having the composition shown in Table 3, was used for the belt body and the backing rubber layer.

TABLE 3

|  | (Parts by Weight) |
|---|---|
| Hydrogenated NBR (1) | 100 |
| Zinc Oxide | 5 |
| Stearic Acid | 1 |
| FEF Carbon Black | 40 |
| Antioxidant (2) | 2 |
| Plasticizer (3) | 5 |
| Accelerator (4) | 2 |
| Accelerator (5) | 1 |
| Sulfur | 0.5 |

(1) Zetpole 2020 (produced by NIPPON ZEON)
(2) N-isopropyl-N'-phenyl-P-phenylenediamene
(3) Dioctylsebacate
(4) Tetramethyl thiuram disulfide
(5) N-cyclohexyl-2-benzothiazylsulfenamide The above materials were combined and sulfonated by means of a conventional press fitting molding method to form the toothed belts. Each belt was subjected to separate running tests (Running Test Nos. 1 and 2) to observe the time to breakage of the toothed portions and to test the wear on each canvas layer. The test results are shown in Table 4.

TABLE 4

|  | Belt No. | | | | | |
|---|---|---|---|---|---|---|
|  | A-1 | A-2 | A-3 | A-4 | A-5 | A-6 |
| Belt life time (hr.) in Running Test 1-1 | 470 | 456 | 383 | 352 | 315 | 320 |
| Belt life time (hr.) in Running Test 1-2 | 736 | 740 | 708 | 675 | 660 | 652 |
| Remaining ratio (%) of tooth bottom canvas in Running Test 2 | 72 | 66 | 52 | 42 | 33 | 30 |

Each of the belts tested had a tooth pitch of 9.525 mm, tooth shape of ZA (from International Standard Organization), 105 teeth, and belt width of 0.75 inches.

Running Test No. 1

The testing apparatus consisted of a 16 tooth drive pulley, a 36 tooth driven pulley, and a tensioning pulley having a 52 mm diameter.

Running condition 1-1 was as follows: ambient temperature of 120° C., a drive pulley rotating speed of 7200 rpm, load of 8 horsepower and initial tension of 15 kgf.

Running condition 1-2 had an ambient temperature of 80° C., a drive pulley rotating speed of 7200 rpm, a load of 8 horsepower and initial tension of 15 kgf.

Running Test No. 2

This test apparatus had a 20 tooth drive pulley, three 20 teeth driven pulley units, each arranged so that the driven pulley units were spaced apart from the drive pulley in the same plane, and each pulley was provided with an idler pulley having a diameter of 32 mm. Each belt was trained around the above four pulleys and an 80 kg load was applied to one of the driven pulleys. For the running conditions, the driven pulley was rotated at 5500 rpm at an ambient temperature of 120° C. for approximately 300 hours. After 300 hours of running, the thickness of the cover canvas at the bottom portion of the toothed portions of each belt was measured.

The results of the tests are shown in Table 4. It can be seen that the life of each toothed belt, up to the point of breakage in each of the running conditions 1-1 and 1-2, can be prolonged by using an aromatic polyamide fiber spun yarn as a material for the weft yarns. This improved effect is even more evident at high temperatures.

Under condition 2, with the belts operating at high tension and at high temperatures, the belt using an aromatic polyamide fiber spun yarn for the weft yarns showed superior resistance to abrasive wear.

EXAMPLE NO. 2

The amounts of aromatic polyamide spun yarns and urethane elastic yarns used in the canvas layer were varied as shown in Table 5 to produce twilled cover canvas by the same method described for Example 1.

TABLE 5

|  | Belt No. | | | |
|---|---|---|---|---|
|  | B-7 | B-8 | B-9 | B-10 |
| Canvas weft material | Cornex (100% by weight-spun yarn) and urethane elastic yarn | | | |
| Weft structure | $(^{CX}20^S/2 - {}^{SD}140^D/1)/1$ | | | |
| Weft twisting amount (turns/10 cm) | 4 | 10 | 25 | 50 |
| Weft count (units/5 cm) | 110 | 110 | 110 | 110 |
| Warp material | Aromatic polyamide (Technora) | | | |
| Warp structure | $T200^D/1$ | | | |
| Warp twisting amount (turns/10 cm) | 15 | 15 | 15 | 15 |
| Warp count (turns/5 cm) | 100 | 100 | 100 | 100 |
| CANVAS PROPERTIES | | | | |
| Canvas strength in weft direction (kgf/3 cm) | 176 | 162 | 145 | 112 |
| Density (units 3/cm) | 71 | 72 | 71 | 72 |
| Canvas strength in warp direction (kgf/3 cm) | 415 | 413 | 400 | 410 |
| Density (units/3 cm) | 112 | 110 | 113 | 114 |
| Canvas Appearance | Not Good (Uneven thickness) | Good | Good | Good |

Each of the canvas layers was contracted and treated with an adhesive as in Example 1. The life of each belt up to the point of failure was determined under each of conditions 1-1 and 1-2. The test results are shown in Table 6.

TABLE 6

|  | Belt No. | | | |
| --- | --- | --- | --- | --- |
|  | B-7 | B-8 | B-9 | B-10 |
| Belt life time (hr.) in Running Test 1-1 (Note) | 133 Abnormal Wear | 480 | 421 | 120 |
| Belt life time (hr.) in Running Test 1-2 (Note) | 125 Abnormal Wear | 724 | 698 | 380 |

According to the results from Example 2, when the twisting amount of the weft is comparatively small, i.e. 4 turns per 10 cm, the meshing between the aromatic polyamide fiber spun yarn and the urethane elastic yarn is not sufficient to produce a uniform thickness once the lateral contraction occurs during manufacture. The resulting belt exhibits an irregular engagement with pulley units generating an uneven wear which may result in premature belt failure.

When the twisting amount is large i.e. 50 turns per 10 cm, the resulting canvas has a normal appearance and substantially a uniform thickness. However, the canvas has reduced strength in the weft direction. This belt is subjected to stress concentration at the tooth base portions which results in crack generation at an early stage in the belt life.

According to the invention, since the weft yarns are highly rigid, the warp yarns must be made similarly rigid so that the woven yarns are balanced to form a canvas with a uniform thickness. The aromatic polyamide fiber spun yarns mesh with the urethane elastic yarn to produce a uniform canvas thickness.

Resultingly, the belt has a uniform PLD value to insure a long life. The cover canvas is highly effective in its resistance to abrasion. The canvas layer protects the teeth and avoids crack generation in the tooth base as might otherwise shorten the belt life.

With the twisting amount of the weft between 8 and 40 turns per 10 cm, the aromatic polyamide fiber spun yarn effectively meshes with the urethane elastic yarn to form a cover canvas with a smooth surface and uniform thickness. This maintains the strength of the belt in the weft direction, thereby further improving the durability of the belt.

The foregoing disclosure of specific embodiments is intended to be illustrative of the broad concepts comprehended by the invention.

We claim:

1. A transmission belt comprising:
   a base section having a plurality of teeth spaced lengthwise of the belt; and
   a canvas layer covering the teeth,
   said canvas layer including weft yarns extending in a lengthwise direction, said weft yarns defined by aromatic polyamide fiber spun yarn twisted with a urethane elastic yarn,
   said canvas layer further including warp yarns being formed by twisting at least one aliphatic fiber mono-filament of 10 to 50 denier.

2. The transmission belt according to claim 1 wherein the aromatic polyamide fiber spun yarns comprise at least 40% by weight of an aromatic polyamide fiber.

3. The transmission belt according to claim 1 wherein the warp yarns comprise from 3 to 25 units of aliphatic monofilament of 10 to 50 denier.

4. The transmission belt according to claim 3 wherein the warp yarns are twisted 5 to 30 turns per 10 cm.

5. The transmission belt according to claim 1 wherein the weft yarns are twisted 8 to 40 turns per 10 cm.

6. The transmission belt according to claim 1 wherein the belt teeth are made from one of chlorosulfonated polyethylene rubber (CSM), alkylated chlorosulfonated polyethylene rubber (ACSM), and hydrogenated acrylonitrile-butadiene rubber (hydrogenated NBR).

7. The transmission belt according to claim 1 wherein the warp and weft yarns have a coating thereon consisting of at least one of an RFL solution, isocyanate solution and epoxy solution.

8. The transmission belt according to claim 1 wherein the aromatic polyamide fiber spun yarns comprise approximately 50% by weight of an aromatic polyamide fiber.

9. The transmission belt according to claim 1 wherein the aromatic polyamide fiber spun yarn has a polyamide fiber containing an aromatic ring in the main chain of the molecular structure thereof.

10. The transmission belt according to claim 1 wherein the aliphatic monofilament is a polyamide.

11. The transmission belt according to claim 10 wherein the aliphatic monofilament is at least one of polyester, nylon-6, nylon-6,6, nylon 4-6, and nylon-12.

12. The transmission belt according to claim 1 wherein the warp yarn has filaments that are at least one of polyvinyl alcohol, polyethylene, and polypropylene.

13. A transmission belt comprising:
    a base section having a plurality of teeth spaced lengthwise of the belt; and
    a canvas layer covering the teeth,
    said canvas layer including weft yarns extending in a lengthwise direction, said weft yarns defined by aromatic polyamide fiber spun yarn twisted with a urethane elastic yarn,
    said canvas layer further including warp yarns made up of aromatic polyamide multi-filament of 1 to 6 denier.

14. The transmission belt according to claim 13 wherein the aromatic polyamide multi-filaments are twisted about themselves.

15. The transmission belt according to claim 13 wherein the warp yarns are made up of from between 100 to 200 units of aromatic polyamide mono-filament.

16. A canvas layer for placement over teeth on a power transmission belt, said canvas layer comprising:
    weft yarns extending in a lengthwise direction, said weft yarns defined by aromatic polyamide fiber spun yarn twisted with a urethane elastic yarn,
    said canvas layer further including warp yarns being made by gathering and twisting at least one aliphatic fiber mono-filament of 10 to 50 denier.

17. The canvas layer according to claim 16 wherein the aromatic polyamide fiber spun yarns comprise at least 40% by weight of an aromatic polyamide fiber.

18. The canvas layer according to claim 16 wherein the warp yarns comprise from 3 to 25 units of aliphatic monofilament of 10 to 50 denier.

19. The canvas layer according to claim 16 wherein the warp yarns are twisted 5 to 30 turns per 10 cm.

20. The canvas layer according to claim 16 wherein the weft yarns are twisted 8 to 40 turns per 10 cm.

21. The canvas layer according to claim 16 wherein the warp and weft yarns have a coating thereon consisting of at least one of RFL solution, isocyanate solution and epoxy solution.

22. The canvas layer according to claim 16 wherein the aromatic polyamide fiber spun yarns comprise approximately 50% by weight of an aromatic polyamide fiber.

23. A canvas layer for placement over teeth on a power transmission belt, said canvas layer comprising:
   weft yarns extending in a lengthwise direction, said weft yarns defined by aromatic polyamide fiber spun yarn twisted with a urethane elastic yarn,
   said canvas layer further including warp yarns made up of a plurality of aromatic polyamide multi-filament of 1 to 6 denier.

24. The canvas layer according to claim 23 wherein the aromatic polyamide multi-filaments are twisted about themselves.

* * * * *